United States Patent
Zanellato et al.

[11] Patent Number: 6,135,165
[45] Date of Patent: Oct. 24, 2000

[54] PRESSURIZED CONTAINER OF PAINT ADDITIVES AND METHOD OF MAKING SAME

[75] Inventors: William G. Zanellato, Sycamore; John W. Lovell, Dekalb, both of Ill.

[73] Assignee: Seymour of Sycamore, Inc., Sycamore, Ill.

[21] Appl. No.: 09/477,238

[22] Filed: Jan. 4, 2000

[51] Int. Cl.$^7$ ................................. B65B 1/04; B65B 3/04
[52] U.S. Cl. ...................... 141/3; 141/4; 141/5; 141/8; 141/18; 141/20; 141/63; 141/64; 141/66; 141/100; 141/104
[58] Field of Search ..................... 141/4, 5, 8, 2, 141/3, 18, 20, 63, 64, 66, 100, 104; 53/467, 470, 473

[56] References Cited

U.S. PATENT DOCUMENTS

| | | |
|---|---|---|
| 3,998,775 | 12/1976 | Taub . |
| 4,014,841 | 3/1977 | Taub . |
| 4,240,940 | 12/1980 | Vasishth et al. . |
| 4,265,797 | 5/1981 | Suk . |
| 4,384,661 | 5/1983 | Page et al. . |
| 4,420,575 | 12/1983 | Rapaport et al. ........................ 523/504 |
| 4,450,253 | 5/1984 | Suk . |
| 4,482,662 | 11/1984 | Rapaport et al. . |
| 4,518,734 | 5/1985 | Brouilette et al. . |
| 4,655,959 | 4/1987 | Stopper ................................... 252/305 |
| 4,923,097 | 5/1990 | Bartlett . |
| 4,938,260 | 7/1990 | Hirz . |
| 4,968,735 | 11/1990 | Page et al. . |
| 5,071,900 | 12/1991 | Page et al. . |
| 5,305,582 | 4/1994 | Abbott ...................................... 53/470 |
| 5,377,724 | 1/1995 | Ray . |
| 5,647,408 | 7/1997 | Erste et al. . |

*Primary Examiner*—Henry J. Recla
*Assistant Examiner*—Timothy L. Maust
*Attorney, Agent, or Firm*—McDonnell Boehnen Hulbert & Berghoff

[57] ABSTRACT

A pressurized package of paint additives is prepared by mixing water, emulsion, stabilizers and a propellant in a pressurizable container. This pressurized container is then sold to retail stores where a water borne paint composition is injected into the pressurized container and sold directly to the end user.

8 Claims, No Drawings

PRESSURIZED CONTAINER OF PAINT ADDITIVES AND METHOD OF MAKING SAME

BACKGROUND

This invention relates to a method and a system to allow for the preparation of a pressurized water borne paint formulation at the point of retail sale to the ultimate end user.

One of the most significant developments in the field of paints and other protective coatings in the last thirty years has been the rapid growth and widespread acceptance of water-based paints. Since they were first introduced in the later forties as an interior wall finish composed of a water-based styrene-butadiene latex, there has been a great increase in the sale of these paints. The paints are practically odorless during their application and dry rapidly.

Latex wall paints produce a low sheen or gloss finish which has good washability within a short period after application. In cases of scratches, mars or dirt pick-up during this period, it is only necessary to touch up the wall with the original paint. In some cases, however, this has become impracticable because the necessity to save some of the original paint or it becomes inconvenient and time consuming to prepare and clean up the equipment such as brushes and rollers. A convenient solution would be the availability of an aerosol can containing an exact match of the original paint. Unfortunately, however, prepackaged water based aerosols are unstable and have a short shelf life, making them impractical as a retail product. Our invention, as described below, solves this problem.

Since the introduction of the aerosol surface coatings, major steps have been taken to improve the formulation of these materials. Acceptable aerosol dispensed paints must have sufficient mechanical stability to withstand the mechanical shearing forces which aerosol water based paint compositions normally experience as they are dispensed from conventional aerosol containers. Insufficient stability results in mechanical shearing of polymeric components of the composition. Agglomerated bits of the composition can clog the narrow orifices of the aerosol valve outlet and interfere with the even disbursement of paint. Agglomerated bits can also break away for the orifice and be delivered onto the surface of the substrate being painted, thereby marring the paint film thereon.

Mechanical stability of paint formulations is depended in a large measure upon maintaining a solution of the polymer in the aerosolized formulation. Proper mechanical stability and low viscosity have been achieved in solvent based systems employing hydrocarbons, alcohols and other solvents. The volatility of the solvent causes rapid thickening of the paint as the aerosolized composition is dispensed and applied to a substrate. The rapid thickening of the aerosol paint during and after it is dispensed is essential to commercial solvent based paint formulations which must be capable of adhering to vertical surfaces without running. That property of a paint composition is referred to herein as vertical cling.

Although organic solvent based aerosol systems have been developed which have good mechanical stability and vertical cling properties, the solvents employed in such systems (e.g., hydrocarbons or alcohols) are flammable, toxic and environmentally undesirable. Thus, it was deemed desirable to develop a water based paint composition which would possess the degree of mechanical stability necessary for it to be dispensed with a minimum of breakup from a conventional aerosol valve, while at the same time possessing a high degree of vertical cling when the composition is sprayed onto a vertical substrate.

In light of the environmental hazards associated with aerosol propellants such as the fluorocarbon propellants, it is also important to employ a propellant which is environmentally friendly, and possesses a low degree of flammability when used as a propellant for water based concentrate. One such propellant is dimethyl ether, which possesses very low flammability in aqueous systems.

Another problem with solvents in water based paint systems is that over time they begin to react adversely with the paint formulation destroying the desirable properties, such as vertical cling. Accordingly, it is an object of this invention to provide methods and a system whereby a stable aerosol water based paint product can be prepared at the point of retail sale to the person who will ultimately use the paint.

It is another object of this invention to provide an aerosol water based paint composition which employs an environmentally safe and acceptable propellant, while at the same time possessing the key attributes desired in an aerosol dispensed, water based paint, i.e., mechanical stability, the ability to provide a foam-free durable coherent film on the substrate to which the paint is applied, the ability of the composition to cling to vertical surfaces without running, as well as the ability to provide finished paint films having a wide range of gloss. In particular, it is an object of this invention to provide a convenient system whereby a consumer at the retail level can obtain an aerosol can of water borne paint composition that matches a previously purchased paint product.

Yet another object is to provide a system and a method of formulating an aerosol paint composition at the point of retail sale that is stable and ready for immediate use by a consumer. Because the final paint formulation is prepared at the point of retail sale, the contact of the propellant with the water borne paint formulation is significantly minimized, thus avoiding the deleterious degradation of the paint formulation. This results in a stable product with excellent performance characteristics.

Although, aerosol water based paints are disclosed by the patent literature (see e.g., Page et al. U.S. Pat. Nos. 4,384,661, 4,265,797, 4,250,253, and 5,071,900; Suk U.S. Pat. Nos. 4,265,797 and 4,450,253; Brouillette et al. U.S. Pat. No. 4,518,734; and Rapaport et al. U.S. Pat. No. 4,482,662), these prior art formulations require that the paint compositions must be specifically formulated to allow them to be aerosolized. However, in our invention, unlike the dimethyl ether propelled compositions of the prior art, we provide a method and system for developing a pressurized can which is capable of accepting water based coatings which are not manufactured specifically to be aerosolized. One advantage of our invention is that it accepts nearly any latex paint without stability problems and prevents agglomeration and gloss loss. It also provides coatings that are environmentally safe, non-flammable and may be cleaned up easily with water.

SUMMARY

The present invention provides a method of preparing an aerosol container of water borne paint comprising of a pressurized container having a filling opening and containing a solvent mixture of a volatile propellant, such as dimethyl ether, stabilizers, water and an emulsion. After the selection of a water borne formulation, for example to match a previously applied paint, it is injected into the pressurized container through the filling opening to form an aerosol container of water borne paint. The present invention provides a method of adding the water borne paint as a last step at the point of retail sale to a mixture of propellant, water, emulsion and stabilizers to allow for flexibility in choice of latex paint used, to ensure stability and to prevent agglomeration.

DETAILED DESCRIPTION

A critical aspect of this invention is the preparation of pressurized container containing paint additives that can be supplied to retail establishments whereby, as a last step, a water borne paint formulation is added immediately prior to the purchase by the user of the aerosolized paint. A necessary component of this invention is the inclusion of a propellant, one particularly preferred propellant is dimethyl ether which has been used in water based aerosol products such as hair sprays, perfumes, air fresheners, insecticides and spray polishes. Dimethyl ether (DME), which is water soluble, has also been successfully used in water based aerosol paints. It has been found useful, not only as a major portion of the propellant phase essential to efficient atomization of the aerosol paint for application purpose, but also because it provides excellent co-solvency with water. The use of dimethyl ether as a propellant/co-solvent overcomes the foaming problems encountered with other aerosol coating containing water. It also overcomes any need for aromatic hydrocarbons or halogenated hydrocarbons in the formulations.

DME is a commercially available liquefiable gas having a boiling point of −23° C. at one atmosphere, and is soluble in water to the extent of about 35% by weight at 24° C. at about 5 atmospheres of pressure. Although any commercially available DME can be used in the present invention, one commercial supplier of DME is DuPont®. Although DME is a preferred propellant, other propellants may be used alone or in addition to DME, for example, propane, carbon dioxide, and nitrous oxide.

In addition to the propellant ingredient, our invention requires the addition of several other components in order to obtain the ultimate desired coating. Preferably, a solution comprising water, an emulsion, and stabilizers are also introduced into the container preferably before the addition of the propellant. By adding the propellant last, the propellant can be used to pressurize the container. Alternatively, the solution of water, emulsion and stabilizers can be added in conjunction with the propellant to the container and sealed and pressurized accordingly.

The emulsion agent, also referred to as a resin, applicable for this invention consists of those rendered water soluble by neutralization of acidic or basic sites thereon which render the emulsion dispersible in molecular or near molecular dimensions, resulting in a single liquid phase. The emulsion agent used can be polyurethane, acrylics, epoxy, styrene, butadiene and any mixture thereof although this group is not limiting. Indeed, other resin examples include styrene acrylics, urethanes, polyesters, and silicone polymers. Water soluble emulsions are commercially available through several different suppliers. One example of a commercially available acrylic latex emulsion suitable for use herein is one obtained from S. C. Johnson Polymer, namely Joncryl 537. The addition of certain acrylic emulsions to the latex system serves to prevent gloss loss, to prevent agglomeration and to prevent stability problems with nearly any latex paint.

The stabilizers used in the invention are selected are from the group consisting of surfactants, plasticizers, antifoam agents, alcohols, pH buffers and mixtures thereof. In particular fluoro surfactants are preferred, specifically FC120 manufactured by 3M. The stabilizers are necessary to insure that the water borne paint formulation, in particular the pH of the concentrate, will not have a corrosive effect on the container. Suitable pH buffers include ammonia, and amines such as triethanol amine. Other suitable stabilizers include AMP-95.

Once the pressurized container of propellant, emulsion, water and stabilizers is prepared, the product is ready for sale at the retail level. Immediately prior to the sale the ultimate end user selects a water borne paint formulation to be added to the pressurized container. Typically, the paint formulation selected is to match an existing color or type of paint previously used. A water borne paint formulation is any water soluble paint composition, preferably latex based paints. Other water borne paint formulations include water reducible alkyds and water based polyurethanes. After selection, the water borne paint composition is injected into the pressurized container through the filling opening in the container to form the aerosol container of water borne paint.

In order to match existing paint colors, a tint base can be added to non-pigmented formulations to form a tinted water borne paint formulation of choice. The choice of tint bases, colors that are used to match a particular paint swatch, depends upon the characteristics and color desired of the coating. Any pigment commonly used in paint compositions can be employed in the present invention. Examples of useful pigments include titanium dioxide, carbon black, phthalocyanimes, molybdates, perlenes, flavanthrones, quinacridones, iron oxide and other known paint tint bases.

Product enhancers, such as thickeners, corrosion inhibitors and flow modifiers, may be added to the composition without departing from the spirit of the disclosure for the scope of the appended claims. Total miscellaneous paint enhancers will generally constitute less than about 5% by weight of the total aerosol can content. These are preferably added during the preparation of the aerosolized container of paint additives prior to the addition of the water borne paint formulation. Thickeners are employed as an ingredient because of their marked increase in the viscosity of the composition which prevents the occurrence of undesirable "running" of the wet paint film when it is sprayed onto a slanted or vertical surface. A wide variety of acrylic emulsion thickening agents are commercially available. One example is Kings PUR 60. An example of a commercially available corrosion inhibitor is AMP-95 and example of a commercially available flow modifier is any fluorosurfactant.

Introduction of the water borne paint formulation into the pressurized can is accomplished using known means, preferably using a can filling machine. The can filling machine can be any apparatus that is known in the art such as a pneumatically controlled aerosol can filling machine disclosed in U.S. Pat. No. 4,938,260 (Hirz), the teachings of which are incorporated herein by reference. The propellant and the solvent mixture can be placed in the container to be utilized as an aerosol spray paint before the cap is crimped thereon and the paint can be forced through a filling valve by a pneumatically operated can filling machine.

The method of this invention includes adding the water borne paint formulation last to avoid agglomeration of the paint particles as a result of prolonged exposure to the propellant. Agglomeration can occur because the propellant, being a solvent, softens most latex polymers, and it being present at very high concentration at the dip tube opening.

For example, a mixture of dimethyl ether and water is added to a standard pressurized spray paint container along with certain acrylic emulsions and stabilizers. The water acts as a dilutent for the dimethyl ether, which prevents the resin agglomeration at the dip tube. The water borne paint composition is injected into the pressurized container at the point of retail sale, immediately prior to its ultimate use by a consumer. Because there is only a short period of time between the relatively final addition of the water borne paint formulation and end use of the pressurized paint composition, the deleterious side effects of the propellant do not manifest themselves.

It should be understood that the embodiments and examples disclosed herein are presented for illustrative purposes only and that many other combinations and articles that embody the methods, formulations and systems will be suggested to persons skilled in the art and, therefore, the invention is to be given its broadest interpretation within the terms of the following claims:

We claim:

1. A method of preparing an aerosol container of water borne paint comprising, in combination,
    a. providing an empty pressurizable container having a filling opening;
    b. introducing a solution comprising water, an emulsion and stabilizers into the container;
    c. pressurizing the container with a propellant to form a pressurized container;
    d. selecting a water borne paint formulation;
    e. injecting the water borne paint formulation into the pressurized container through the filling opening to form an aerosol container of water borne paint.

2. The method of claim 1 wherein the water borne paint composition comprises latex paint.

3. The method of claim 1 wherein the selection of the water borne paint composition comprises selecting a non-pigmented paint formulation and one or more tint bases, adding the tint bases to the non-pigmented paint formulation to form a tinted water borne paint formulation.

4. The method of claim 1 wherein solvent mixture contains product enhancers selected from the group consisting of thickeners, corrosion inhibitors, flow modifiers and mixtures thereof.

5. A method of preparing an aerosol container of water borne paint comprising, in combination,
    a. providing a pressurized container having a filling opening and containing a solvent mixture comprising dimethyl ether, stabilizers, water and an emulsion;
    b. selecting a water borne paint formulation;
    c. injecting the water borne paint formulation into the pressurized container through the filling opening to form an aerosol container of water borne paint.

6. The method of claim 5 wherein the water borne paint composition comprises latex paint.

7. The method of claim 5 wherein the selection of the water borne paint composition comprises selecting a non-pigmented paint formulation and one or more tint bases, adding the tint bases to the non-pigmented paint formulation to form a tinted water borne paint formulation.

8. The method of claim 5 wherein the solvent mixture contains product enhancers selected from the group consisting of thickeners, corrosion inhibitors, flow modifiers and mixtures thereof.

* * * * *